United States Patent [19]
King et al.

[11] Patent Number: 6,108,031
[45] Date of Patent: Aug. 22, 2000

[54] VIRTUAL REALITY TELEOPERATED REMOTE CONTROL VEHICLE

[75] Inventors: Michael Arden King; Gary Lee Paderewski, both of Colorado Springs, Colo.

[73] Assignee: Kaman Sciences Corporation, Colorado Springs, Colo.

[21] Appl. No.: 08/853,369

[22] Filed: May 8, 1997

[51] Int. Cl.[7] ............................. H04N 7/00; H04N 7/18; H04N 9/47
[52] U.S. Cl. ................................ 348/118; 348/39; 348/47
[58] Field of Search .................................. 348/42, 46, 47, 348/36, 37, 38, 39, 113, 115, 118; H04N 7/00, 7/18, 9/47

[56] References Cited

U.S. PATENT DOCUMENTS

| | | | |
|---|---|---|---|
| 1,841,487 | 1/1932 | Lewis | 348/42 |
| 3,504,122 | 3/1970 | Ratliff, Jr. | 348/47 |
| 3,564,134 | 2/1971 | Rue et al. | |
| 4,746,977 | 5/1988 | White | |
| 4,818,858 | 4/1989 | Sorimachi et al. | 348/42 |
| 4,855,822 | 8/1989 | Narendra et al. | |
| 4,897,715 | 1/1990 | Beamon, III | 348/42 |
| 5,015,187 | 5/1991 | Lord | |
| 5,016,004 | 5/1991 | Funk et al. | |
| 5,147,002 | 9/1992 | Hughes | |
| 5,331,413 | 7/1994 | Diner | |
| 5,481,257 | 1/1996 | Brubaker et al. | |
| 5,652,849 | 7/1997 | Conway et al. | 348/115 |
| 5,684,496 | 11/1997 | Parus | 348/115 |

*Primary Examiner*—Howard Britton
*Assistant Examiner*—Nhon T Diep
*Attorney, Agent, or Firm*—McCormick, Paulding & Huber LLP

[57] ABSTRACT

A steerable motor vehicle is remotely controlled by a human operator at a remote control station with the operator being supplied with three-dimensional realistic visual representations of scenes in the vicinity of the vehicle to allow him to exercise more accurate control of the vehicle taking into account objects and other features occurring in the environment immediately encountered by the vehicle. The vehicle carries two vehicle cameras for binocularly viewing scenes, and the viewed scenes are transmitted by RF communication links to the remote control station where the scenes are recreated on two display screens, forming part of a virtual reality headset worn by the operator, viewed separately by separate eyes of the operator to create a three-dimensional and realistic impression of the scenes seen by the two cameras.

6 Claims, 3 Drawing Sheets

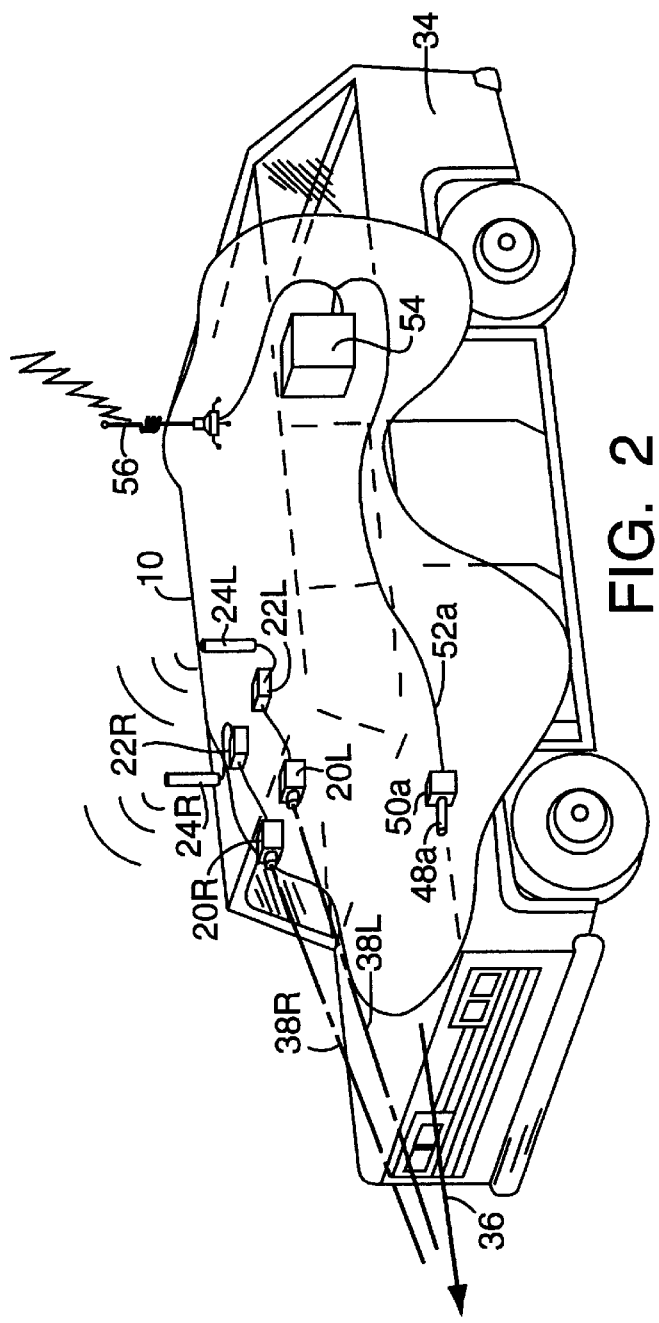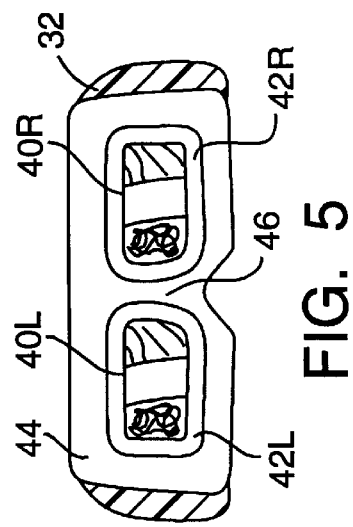

VIRTUAL REALITY TELEOPERATED REMOTE CONTROL VEHICLE

FIELD OF THE INVENTION

The invention concerns the remote control of steerable motor vehicles, and deals more particularly with remote control apparatus for use with steerable motor vehicles in applications where the controlled vehicle may become so distanced from the human operator at a control station that the operator cannot, either with his eyes alone or with the aid of binoculars or other standard optical devices, obtain a clear view of the vehicle and of the environment in which the vehicle is momentarily located.

BACKGROUND OF THE INVENTION

The invention has particular utility in association with the remote control of land vehicles, and is, therefore, herein described in conjunction with such a vehicle. There is, however, no intention to limit the invention to land vehicles, and instead, it may also be applied, if desired, to the remote control of aircraft and water craft, including both surface vessels and submarines.

In the use of steerable motor vehicles, situations often arise in which it is preferable, for safety or other reasons, that the vehicle not carry a human occupant. Examples of such situations are the operation of snow plows for clearing roads in avalanche-prone areas, the transport of materials, sensing instruments or other items into areas of hazardous waste disposal, the operation of mine-detonating vehicles, and the operation of vehicles used for target practice purposes. To meet the need for unmanned vehicles, many different types of remote control systems have been proposed and used in the past for allowing a vehicle to be operated from a control station remote from the vehicle and connected with the vehicle by one or more communication links. In some of these known systems, a camera is carried by the control vehicle and a picture of the view seen by the camera is transmitted by a communication link to the remote control station and reproduced there on a display screen to give the operator some visual information on the vehicle's environment. The visual displays given to the operator, however, have been two-dimensional ones and, therefore, have not afforded the operator a good perception of depth and reality in regard to the scene encountered by the vehicle.

The object of the invention is, therefore, to provide a system for remotely controlling steerable motor vehicles and which system provides the operator at a remote station an improved, three-dimensional and realistic, view of a scene in the vicinity of the vehicle to allow the operator to precisely control the operation of the vehicle in relation to its surroundings.

A more particular object of the invention is to provide a remote control system for a steerable motor vehicle wherein the operator at the remote control station is provided with a three-dimensional view of a scene in the vicinity of the vehicle by means of a virtual reality headset worn by the operator.

Other objects and advantages of the invention will be apparent from the following description of a preferred embodiment of the invention and from the accompanying drawings and claims.

SUMMARY OF THE INVENTION

The invention resides in a system for remotely controlling a steerable motor vehicle whereby an operator of the vehicle located at a remote control station is provided with a realistic three-dimensional view of the environmental scene encountered by the vehicle to permit the operator to accurately steer and otherwise control the vehicle in relation to its momentary surroundings.

More particularly, the invention resides in the controlled vehicle carrying a pair of cameras for binocularly viewing scenes encountered by the vehicle, in the scenes viewed by the two cameras being transmitted by individual RF communication links to the remote station, and in at the remote station the transmitted signals being converted into signals for driving two display screens so that each screen displays a representation of the view seen by a respective one of the cameras and with the two display screens being arranged so that each screen is viewed by a respective one of the eyes of the operator to give the operator a three-dimensional and realistic impression of the environmental scene confronting the vehicle.

The invention further resides in the two display screens at the remote control station being ones contained in a virtual reality headset to be worn by the operator, and in the system further including other RF communication links between the vehicle and the ground station for transmitting operating parameter control signals to the vehicle from the remote station and for transmitting operating condition data and other information from the controlled vehicle to the remote control station.

The invention also resides in other features of the remote control system defined in the accompanying claims.

BRIEF DESCRIPTION OF THE DRAWINGS

FIG. 2 is a perspective view of the vehicle of FIG. 1 with the snow plow removed.

FIG. 5 is a view showing the two display screens of the virtual reality headset of FIG. 3 as seen by the operator.

DETAILED DESCRIPTION OF THE PREFERRED EMBODIMENT

Figure 1:
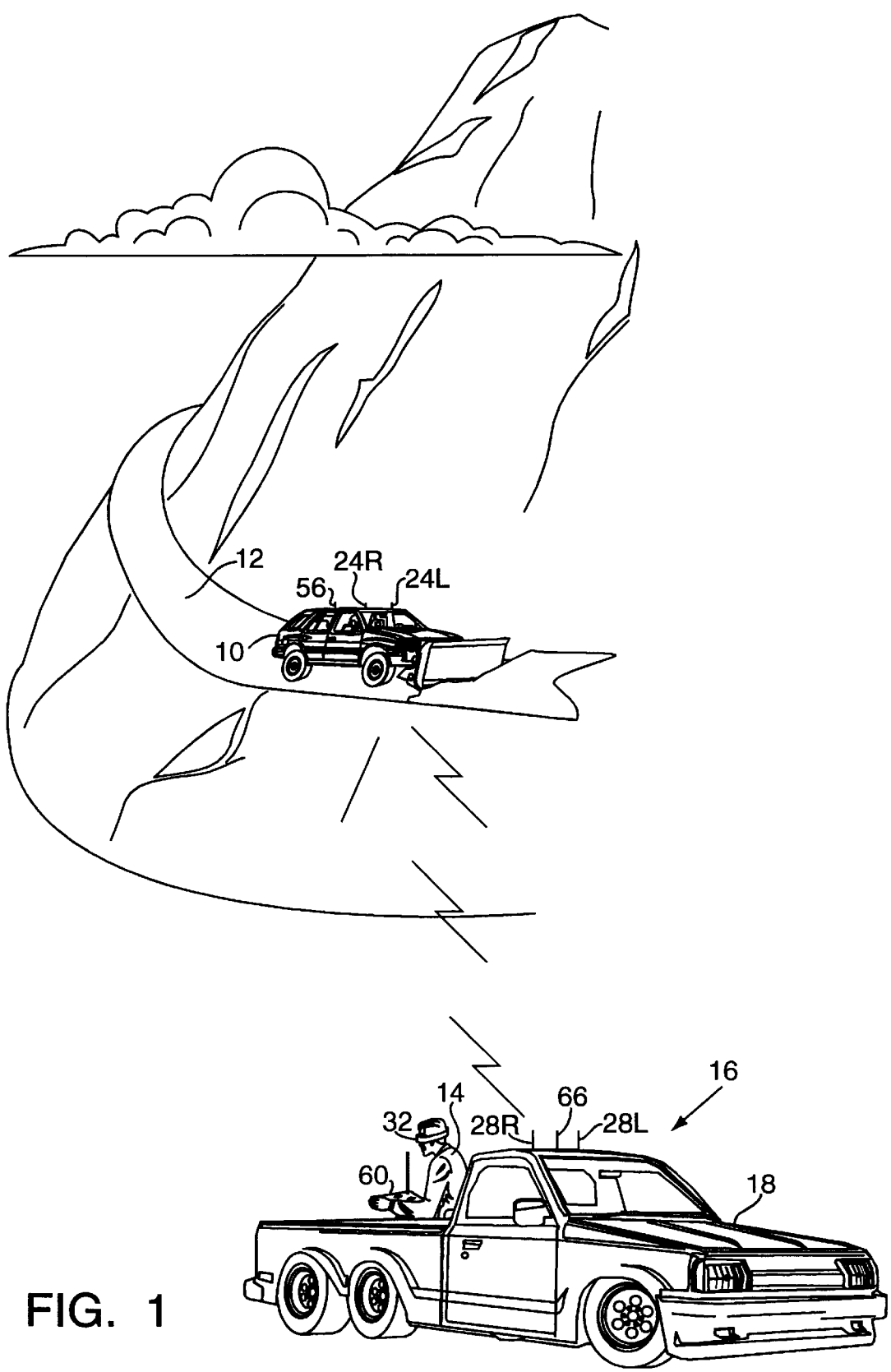
FIG. 1 is a view of mountainous territory showing a control system embodying the invention used for remotely controlling a snowplowing vehicle.
Figure 3:
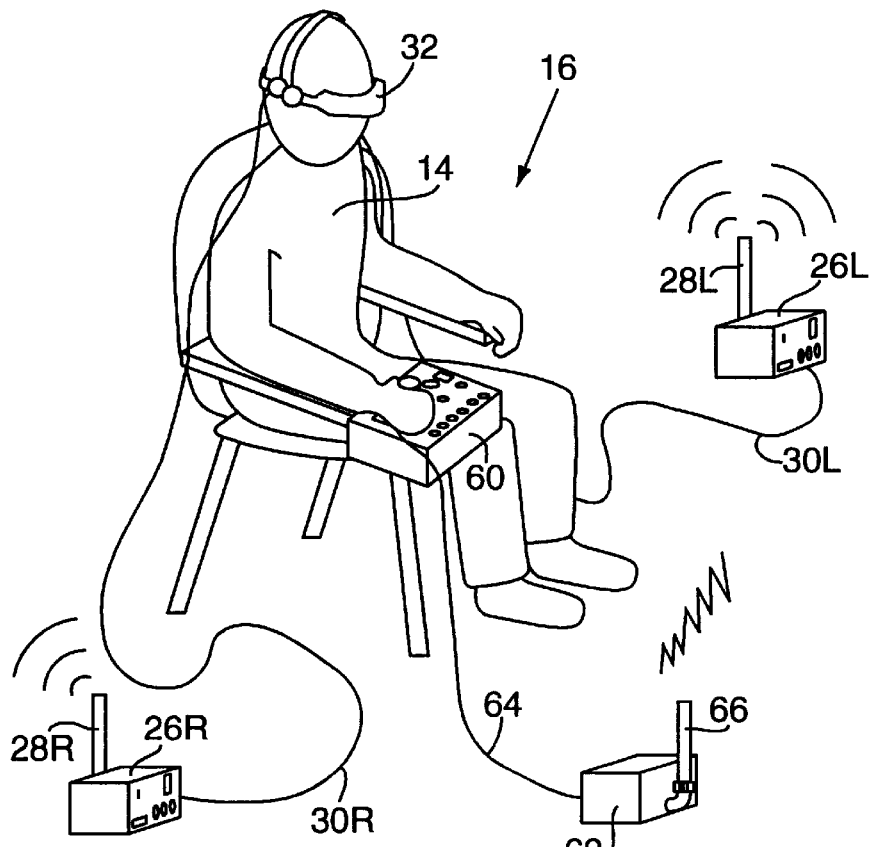
FIG. 3 is a schematic view of the remote control station of FIG. 1.

The remote control system of the invention, as mentioned, may be used in a wide variety of applications for the control of steerable motor vehicles, and by way of example is shown in FIG. 1 as applied to the control of an unoccupied snow plowing steerable motor vehicle 10, driven by an internal combustion engine, engaged in the plowing of a road 12 in what may be an avalanche-prone region. The operation of the vehicle 10 is controlled by a human operator 14 located at a remote control station, indicated generally at 16, which in the illustrated instance is carried by another vehicle 18. The controlled vehicle 10 and the control station 16, as explained in more detail hereinafter, are in communication with one another through line of sight (LOS) radio frequency (RF) links which allow the remote control station 16 to be positioned at some safe location up to 1,000 ft. or so from the controlled vehicle 10, using LOS equipment not requiring FCC license; and the distance can be extended to a range of up to several miles or more by using power amplifiers and/or relays, which may require FCC license for other than Government operations.

In accordance with the invention, the steerable remote controlled motor vehicle 10 is equipped with two video cameras 20R and 20L (letter R meaning right and referring to the right camera and the letter L meaning left and referring to the left camera)for viewing scenes in the vicinity of the vehicle, and the scenes captured by these cameras are transmitted by two video signal RF transmitters 22R and 22L, transmitting on individual carrier frequencies and individually associated with the two cameras, to the remote control station 16 where they are received by two receivers 26R and 26L individually receiving a respective one of the two signals transmitted by the two transmitters 22R and 22L. The two signals received by the two receivers 26R and 26L, through associated receiving antennas 28R and 28L are converted by the receivers into video signals for individually driving two associated video display screens, the video signal from the receiver 26R appearing on the line 30R and the video signal produced by the receiver 26L appearing on the line 30L.

The two video display screens fed by the signals on the lines 30R and 30L are arranged so that the operator 14 views each of the screens by the associated one of his two eyes so as to give him a three-dimensional and realistic impression, derived from the two display screens, of the scene immediately viewed by the two cameras 20R and 20L of the controlled vehicle. The two display screens may be arranged in a number of different ways, but preferably are ones which are part of a virtual reality headset 32 worn by the operator 14, which headset may be any of a number of commercially available ones of the type customarily used for three-dimensional viewing of scenes generated by computers using so called "virtual reality" programs, and which headsets are often referred to as "virtual reality goggles". FIG. 5 shows a view of the headset 32 as seen by the operator 14 with its two display screens being indicated at 40L and 40R. The screens are located at the forward ends of recesses 42L and 42R in the front body 44 of the headset, and the body 44 includes a vertical wall portion 46 separating the two screens 40L,40R from one another to facilitate viewing of each screen separately by the associated eye of the operator.

The video cameras 20R and 20L may be carried in various ways by the controlled vehicle 10, and as shown in FIG. 2, the vehicle 10 includes a body 34 having a normal forward direction indicated by the arrow 36 and the cameras 20R and 20L are mounted to the body 34 So as to look forwardly along lines of sight 38R and 38L, respectively, which lines of sight at the cameras 20R and 20L are spaced from one another by approximately the human interoccular distance (about 3.5") and which lines of sight converge at some point spaced a predetermined distance forwardly from the forward end of the vehicle with respect to the normal forward direction 36 of the vehicle body.

Each of the two cameras 20R and 20L is one made in accordance with NTSC standards and the two associated transmitters 22R and 22L are ones capable of transmitting the video signals from the two cameras in NTSC format with the transmitters 22R and 22L operating at two distinctly different carrier frequencies of, for example, about 2.4 GHz.

At the control station 16, the receiver 26R is tuned to receive the signal transmitted by the transmitter 22R and antenna 24R on the controlled vehicle; and the receiver 26L is tuned to receive the signal transmitted by the receiver 22L and antenna 24L on the controlled vehicle. The video signals output by the two receivers 26R and 26L, on the two output lines 30R and 30L, correspond respectively to the video signals produced by the two video cameras 20R and 20L on the controlled vehicle 10 and respectively drive the two screens 40R and 40L, which can, for example, be either liquid crystal display screens or miniature cathode ray display screens.

Figure 4:
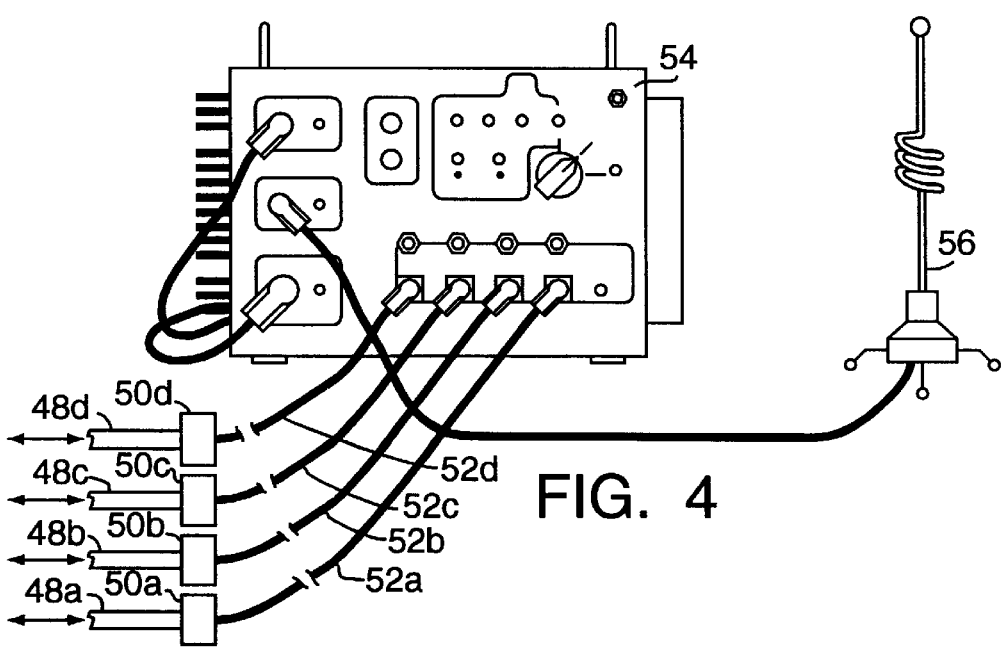
FIG. 4 is an elevational view of the transceiver and control unit contained in the vehicle of FIG. 2.

The controlled vehicle 10 has a number of operating parameters which are controllable to cause the vehicle to execute operating functions. In the illustrated case, the vehicle 10 is one having at least four such parameters, namely transmission setting, throttle setting, steering setting and brake setting. For each of these parameters, the vehicle has a movable mechanical element, the position of which controls the associated parameter; and connected with each of these mechanical, movable control members is a positioning control unit for positioning the mechanical element in response to an electrical signal representing a desired value of the control parameter. For example, in FIG. 2, the illustrated mechanical control rod 48a is one which corresponds generally to the brake pedal of a conventional automobile and the braking system of the vehicle is operated in response to the position of the member 48a. The member 48a is in turn positioned by a positioning unit 50a which positions the member 48a in response to position command signals supplied to it by the line 52a from a control module 54 carried by the vehicle 10. As shown in FIG. 4, movable mechanical control elements 48b, 48c and 48d, positioning units 50b, 50c and 50d and command signal supply lines 52b, 52c and 52d, similar to the member 48a, unit 50a and line 52a are provided for each of the other three controlled parameters of the vehicle with the signals transmitted by the supply lines originating from the control module 54.

The control module 54 is in part an RF transceiver which receives, through an antenna 56, control signals transmitted to it from the control station 16 and which also transmits to the control station, if desired, data indicating various vehicle conditions, such as whether the engine of the vehicle is running or not. The control module 54 separates the control signals received by it into ones for the individually controlled operating parameters and transmits such signals to the associated control units 50a, 50b, 50c and 50d over the lines 52a, 52b, 52c and 52d.

For supplying the control signals transmitted to the controlled vehicle 10, the remote control station 16 includes a control box 60 having a plurality of movable control elements for individually controlling each of the control parameters of the controlled vehicle 10. The control signals dictated by the operator 14, through manipulation of the control elements of the control box 60, are transmitted to a transceiver 62 over the line 64 and are transmitted by the transceiver 62 through the antenna 66 to the controlled vehicle 10, where they are picked up by the antenna 56 and received by the control module 54. The transceiver 62 also receives signals transmitted by the control module 54 of the controlled vehicle 10 to the remote control station 16 concerning the condition of the motor vehicle which signals are transmitted to the control box 60 over the line 64 and used to actuate corresponding indicators of the control box 60. The transceiver portion of the control module 54 of the controlled vehicle 10 and the transceiver 62 of the remote control station 16 are ones operating on carrier frequencies of around 900 MHz.

We claim:

1. A system for remote control of a steerable motor vehicle, said system comprising:

a steerable motor vehicle having a plurality of vehicle operating parameters and a corresponding plurality of control means for controlling said parameters in response to inputs thereto defining desired values of said parameters, two cameras carried by said vehicle for binocularly viewing scenes in the vicinity of said vehicle, a remote station apparatus having two visual display screens each viewable by a respective one of the two eyes of the operator, two radio frequency transmitters carried by said vehicle, each of which radio frequency transmitters is coupled to one of said cameras, a first pair of antennas mounted on said vehicle, each of which antennas is in communication with one of said radio frequency transmitters for transmitting from said vehicle a radio frequency signal carrying the scene viewed by said camera to be reproduced by a respective one of said display screens to give said operator a three-dimensional impression of the scenes viewed by said two cameras, a second pair of antennas coupled to said remote station apparatus each for respectively receiving signals transmitted by one of said two radio frequency transmitters carried by said vehicle, two radio frequency receivers each in communication with one of said antennas forming said second pair of antennas, said radio frequency receivers forming part of said remote station apparatus, each of said radio frequency receivers for converting said signals from one of said radio frequency transmitters into signals for driving one of said two display screens, said remote station apparatus including a plurality of control elements operable by said human operator to dictate desired values of said vehicle operating parameters, means for transmitting said dictated desired values of said vehicle operating parameters to said vehicle, and means carried by said vehicle for receiving said transmitted dictated desired values of said vehicle operating parameters and for delivering said dictated desired values to said control means as said inputs thereto.

2. A system for remote control of a steerable motor vehicle as defined in claim 1, wherein:

said vehicle operating parameters include ones controllable to cause said vehicle to execute starting, stopping, driving and steering functions.

3. A system for remote control of a steerable motor vehicle as defined in claim 1, wherein:

said two cameras have lines of sight which lines of sight are spaced from one another at approximately a human interoccular spacing.

4. A system for remote control of a steerable motor vehicle as defined in claim 1, wherein:

said motor vehicle has a body with a normal forward direction of motion, and said two cameras are carried by said body so that said two cameras binocularly view a scene located ahead of said vehicle with respect to said normal forward direction of motion of said body.

5. A system for remote control of a steerable motor vehicle as defined in claim 1, wherein:

said two visual display screens are part of a virtual reality headset wearable by said operator.

6. A system for remote control of a steerable motor vehicle as defined in claim 1, wherein:

said means for transmitting said dictated desired values of said vehicle operating parameters from said remote station apparatus includes a transceiver forming part of said remote station apparatus for transmitting radio frequency signals to and for receiving radio signals from said vehicle, and said means carried by said vehicle for receiving said transmitted dictated desired values of said vehicle operating parameters including a transceiver carried by said vehicle for transmitting radio frequency signals to and for receiving radio frequency signals from said remote station apparatus.

* * * * *